(12) United States Patent
Ma et al.

(10) Patent No.: US 11,717,889 B2
(45) Date of Patent: Aug. 8, 2023

(54) MULTI-METALLIC ARTICLES OF MANUFACTURE

(71) Applicant: ExxonMobil Technology and Engineering Company, Annandale, NJ (US)

(72) Inventors: Ning Ma, Whitehouse Station, NJ (US); Hyun-Woo Jin, Easton, PA (US); Shiun Ling, Washington, NJ (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 464 days.

(21) Appl. No.: 16/739,626

(22) Filed: Jan. 10, 2020

(65) Prior Publication Data

US 2020/0230697 A1 Jul. 23, 2020

Related U.S. Application Data (60) Provisional application No. 62/795,072, filed on Jan. 22, 2019.

(51) Int. Cl.
*B22F 7/08* (2006.01)
*B22F 10/25* (2021.01)
(Continued)

(52) U.S. Cl.
CPC ............... *B22F 7/08* (2013.01); *B22F 10/25* (2021.01); *B22F 10/38* (2021.01); *B22F 10/34* (2021.01);
(Continued)

(58) Field of Classification Search
CPC ............ B22F 10/20; B22F 7/08; B22F 10/25; B22F 2301/052; B22F 2301/15; B22F 2301/35;
(Continued)

(56) References Cited

U.S. PATENT DOCUMENTS

| 2,539,247 A | 1/1951 | Hensel |
| 5,642,853 A | 7/1997 | Lee |
| 2009/0208773 A1 | 8/2009 | Dupont et al. |

(Continued)

FOREIGN PATENT DOCUMENTS

| JP | 60261683 A | 12/1985 |
| WO | 2013/112217 A2 | 8/2013 |

OTHER PUBLICATIONS

Bandyopadhyay et al. Additive Manufacturing of multi-material structures, Materials Science and Engineering R, 2018 (Year: 2018).*

(Continued)

*Primary Examiner* — Brian D Walck
*Assistant Examiner* — Danielle Carda
(74) *Attorney, Agent, or Firm* — C. Tumey Law Group PLLC (57) ABSTRACT

Methods disclosed herein include using additive manufacturing to create a joint between a first metallic material and a second metallic material that is different from the first metallic material, wherein the porosity of the joint is less than about 0.1 percent by volume measured according to ASTM B-962. The additive manufacturing can be performed such that no intermetallic brittle phase forms between the first metallic material and the second metallic material.

12 Claims, 9 Drawing Sheets

(51) Int. Cl.
    *B22F 10/38*     (2021.01)
    *B33Y 10/00*     (2015.01)
    *B33Y 70/00*     (2020.01)
    *B33Y 80/00*     (2015.01)
    *B22F 12/53*     (2021.01)
    *B22F 10/34*     (2021.01)

(52) U.S. Cl.
    CPC .......... *B22F 12/53* (2021.01); *B22F 2301/052* (2013.01); *B22F 2301/15* (2013.01); *B22F 2301/35* (2013.01); *B22F 2301/40* (2013.01); *B33Y 10/00* (2014.12); *B33Y 70/00* (2014.12); *B33Y 80/00* (2014.12)

(58) Field of Classification Search
    CPC ..... B22F 2301/40; B33Y 10/00; B33Y 70/00; B33Y 80/00; B23K 2103/04; B23K 2103/14; B23K 2103/18; B23K 2103/26
    USPC ............................................................ 419/1
    See application file for complete search history.

(56) References Cited

U.S. PATENT DOCUMENTS

| | | |
|---|---|---|
| 2015/0021379 A1 | 1/2015 | Albrecht et al. |
| 2017/0291222 A1 | 10/2017 | Khatiwada et al. |
| 2018/0127866 A1* | 5/2018 | Irumata ................... B22F 10/20 |
| 2018/0161931 A1 | 6/2018 | Li et al. |

OTHER PUBLICATIONS

The International Search Report and Written Opinion of PCT/US2020/013088 dated Apr. 6, 2020.

The International Search Report and Written Opinion of PCT/US2020/013128 dated May 7, 2020.

Suzuki et al., "Effect of layer thickness on bonding strength of Al/epoxy resin joints via interpenetrating phase layer", J. Materials Processing Tech. 254 (2018) 338-345.

Liu et al., "Preparation and its cavitation performance of nickel foam/epoxy/SiC co-continuous composites", Wear 332-333(2015) 979-987.

"State of the art about dissimilar metal friction stir welding", Aude Simar et. al., Science and Technology of Welding and Joining, 2016, 22, 389-403.

"Design Considerations of Graded Transition Joints for Joining Dissimilar Alloys", Gregory J. Brentrup, Brett S. Snowden, John N. DuPont, Joachim L. Grenestedt, Welding Journal, vol. 91, No. 9, Sep. 2012, pp. 252s-259s.

'Microstructural Development and Solidification Cracking Susceptibility of Cu Deposits on Steel, Part II: Use of a Nickel Interlayer', F.F. Noecker and J.N. DuPont, , Journal of Materials Science & Engineering, 2007,42(2), pp. 510-521.

"Application of hybrid additive manufacturing methodology to produce a metal/polymer customized dental implant", M. Silva et al. Procardia Manufacturing 12 (2017) 150-155.

* cited by examiner

MULTI-METALLIC ARTICLES OF MANUFACTURE

CROSS-REFERENCE TO RELATED APPLICATIONS

This application claims the benefit of U.S. Provisional Application No. 62/795,072, filed Jan. 22, 2019, the entire contents of which are incorporated herein by reference.

BACKGROUND

Field

The present disclosure relates to multi-metallic articles of manufacture and methods of making multi-metallic articles of manufacture.

Description of Related Art

Equipment and structures used in oil, gas, and petrochemical operations are exposed to a wide range of temperature, stresses, and environmental conditions. Single composition metallic materials often do not offer the range of properties needed in the equipment and structures used in these applications. Multi-metallic materials are of interest, however, joining metals and metal alloys has traditionally been difficult. Known methods for joining two different metallic materials can cause the formation of a brittle phase at the interface.

Fusion welding processes have traditionally been used to join two metallic materials. This process starts from melting metal consumables, usually in the form of wires. Upon solidification, the molten metal is bonded on a substrate. The consumable and the substrate can be dissimilar metallic materials. There are several difficulties associated with this fusion welding process, including metallurgical incompatibility, the segregation of high and low melting phases, and possible large residual stresses from the physical mismatch.

In addition to fusion welding processes, there are also solid state processes such as friction and friction stir processes. These processes have been used to join dissimilar metals such as Al/steel, Mg/steel, and Al/Ti, for example. However, the required process conditions for these processes limit the applicability to articles with relatively simple geometries, and these processes are generally unsuitable for more demanding geometries.

There is a need in the art for improved multi-metallic articles of manufacture and methods for making such articles. The present disclosure provides a solution for this need.

SUMMARY

A method includes joining by additive manufacturing a first metallic material and a second metallic material different from the first metallic material. Additive manufacturing can be performed such that the porosity of the joint is less than 0.1 percent by volume, measured according to ASTM B-962. Such porosity can provide a strong, substantially crack free bond (e.g., without an intermetallic brittle phase) between the first metallic material and the second metallic material.

Additive manufacturing can include a meltpool with a fast cooling rate such that no intermetallic brittle phase forms at the interface between the first metallic material and the second metallic material. One skilled in the art can control the cooling rate in various ways, e.g., by adjusting the power input to the additive manufacturing laser or adjusting the laser's travel speed. The second metallic material can be additively manufactured directly on the first metallic material such that the first and the second metallic material are bonded directly together.

In certain embodiments, additive manufacturing includes laser metal deposition (LMD). The cooling rate can be between about 100 and 5000° C. per second, such as between about 100 and 3000° C., 100 and 2000° C., or 100 and 1000° C.

The method can further include forming a transition layer between the first and the second metallic materials.

In certain embodiments, forming the transition layer can include mixing a powder of the first metallic material and a powder of the second metallic material to form a mixture, and using the mixture to additively manufacture the transition layer. In certain embodiments, forming the transition layer can include disposing a buffer layer made of a buffer material on the first or second metallic material before additively manufacturing the first or second metallic material on the transition layer. The buffer material is compatible with, but different from, the first metallic material and the second metallic material to allow fusion on both sides of the transition layer without formation of an intermetallic brittle phase or cracks.

The first metallic material and the second metallic material can be dissimilar metals or dissimilar metal alloys. The first metallic material and/or the second metallic material can include at least one of iron-based alloys, steel, nickel-based alloys, aluminum-based alloys, titanium-based alloys, cobalt-based alloys and copper-based alloys or any combinations thereof. In certain embodiments, one of the first metallic material or the second metallic material can include one of aluminum or magnesium, and the other of the first metallic material or the second metallic material can be one of steel or titanium.

In certain embodiments, the buffer material can include molybdenum, e.g., where one of the first metallic material or the second metallic material is iron, and the other of the first metallic material or the second metallic material is titanium. The buffer material can include silver, e.g., where one of the first metallic material or the second metallic material is aluminum, and the other of the first metallic material or the second metallic material is one of an iron-nickel alloy or a nickel-cobalt alloy. The buffer material can include nickel, e.g., where one of the first metallic material or the second metallic material is copper, and the other of the first metallic material or the second metallic material is iron.

The transition layer or the buffer layer can be formed to have a thickness of about 1 mm or less, 0.5 mm or less, 0.1 mm or less, or even 0.025 mm or less, to have a sharp transition gradient. For example, the transition layer or the buffer layer can be formed to be between about 0.01, 0.02, 0.025, 0.05, 0.1, or 0.15 mm to 0.05, 0.1, 0.15, 0.35, 0.5, or 1 mm thick, including any combination of any minimum or maximum value recited herein. An article of manufacture can include a first metallic material and a second metallic material that is dissimilar from the first metallic material additively manufactured thereon, wherein no intermetallic brittle phase or cracks exists between the first metallic material and the second metallic material. The article can include a transition layer between the first metallic material and the second metallic material of less than about 1 mm (e.g., about 0.025 mm). In certain embodiments, the transition layer can be a buffer layer made of a buffer material that is compatible with the first metallic material and the second metallic material to allow fusion on both sides of the transition layer without formation of intermetallic brittle phase.

These and other features of the systems and methods of the subject disclosure will become more readily apparent to those skilled in the art from the following detailed description taken in conjunction with the drawings.

BRIEF DESCRIPTION OF THE DRAWINGS

For purposes of illustration and not limitation, embodiments of the invention will be described in detail below with reference to the figures, wherein.

DETAILED DESCRIPTION

Reference will now be made to the drawings wherein like reference numerals identify similar structural features or aspects of the subject disclosure.

Figure 1A:
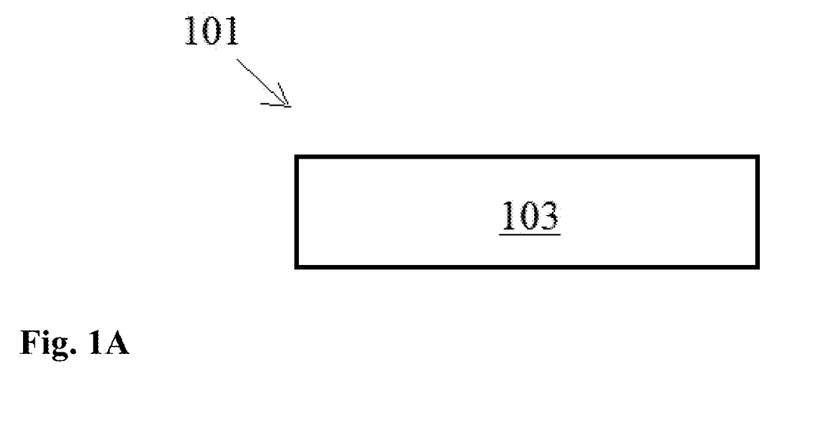
FIGS. 1A-1D show joining, by additive manufacturing, of a first metallic material and a second metallic material.

Referring to FIG. 1A, a method includes providing a first metallic substrate 101 comprising a first metallic material 103. The metallic substrate 101 can be manufactured in any suitable manner (e.g., additively manufactured, cast, etc.). For example, the metallic substrate 101 can be formed in a single additive manufacturing procedure, such as by a machine having the ability to selectively deposit multiple materials in a single procedure.

Figure 1B:
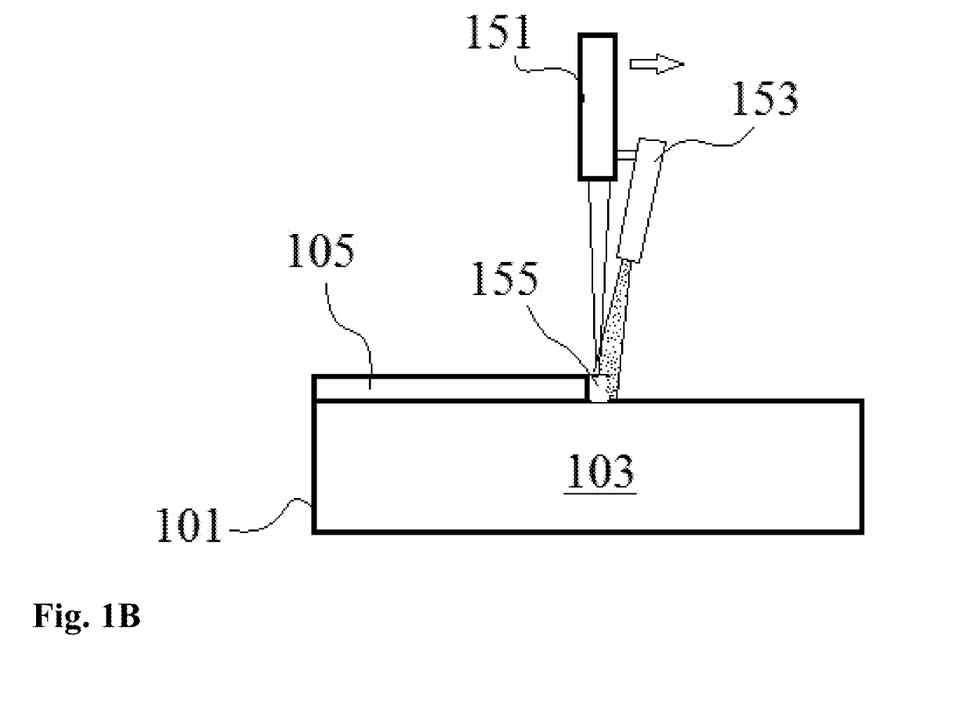
Figure 1C:
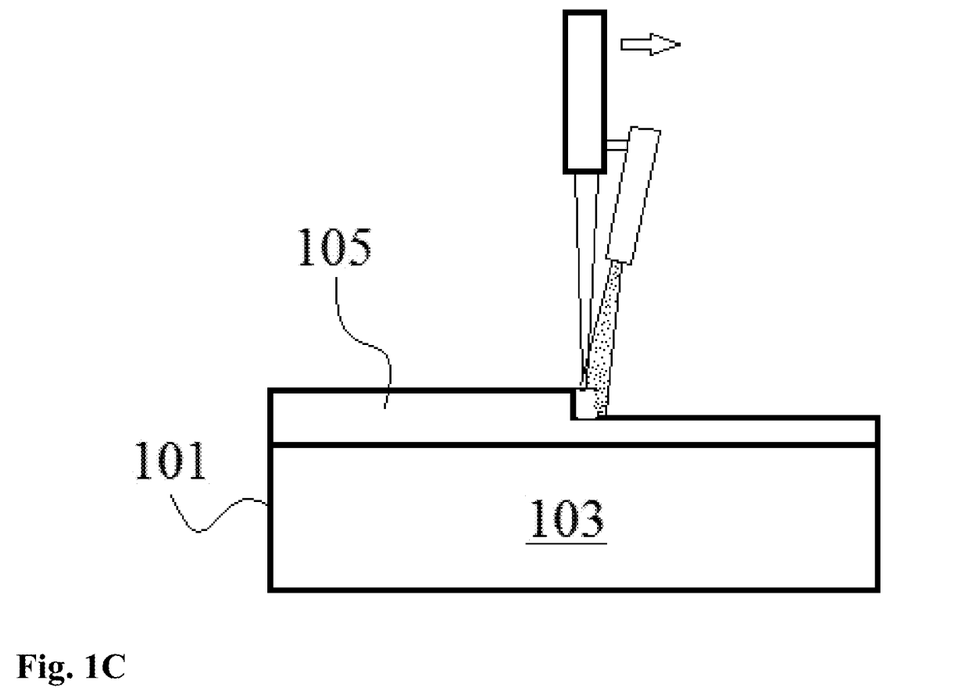
Figure 1D:
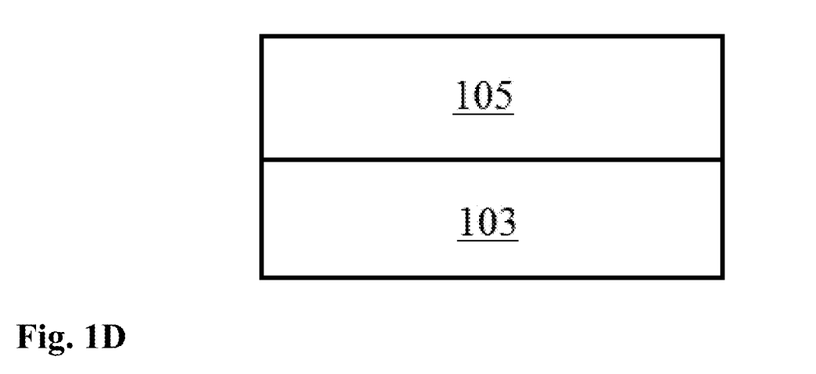
Figure 3:
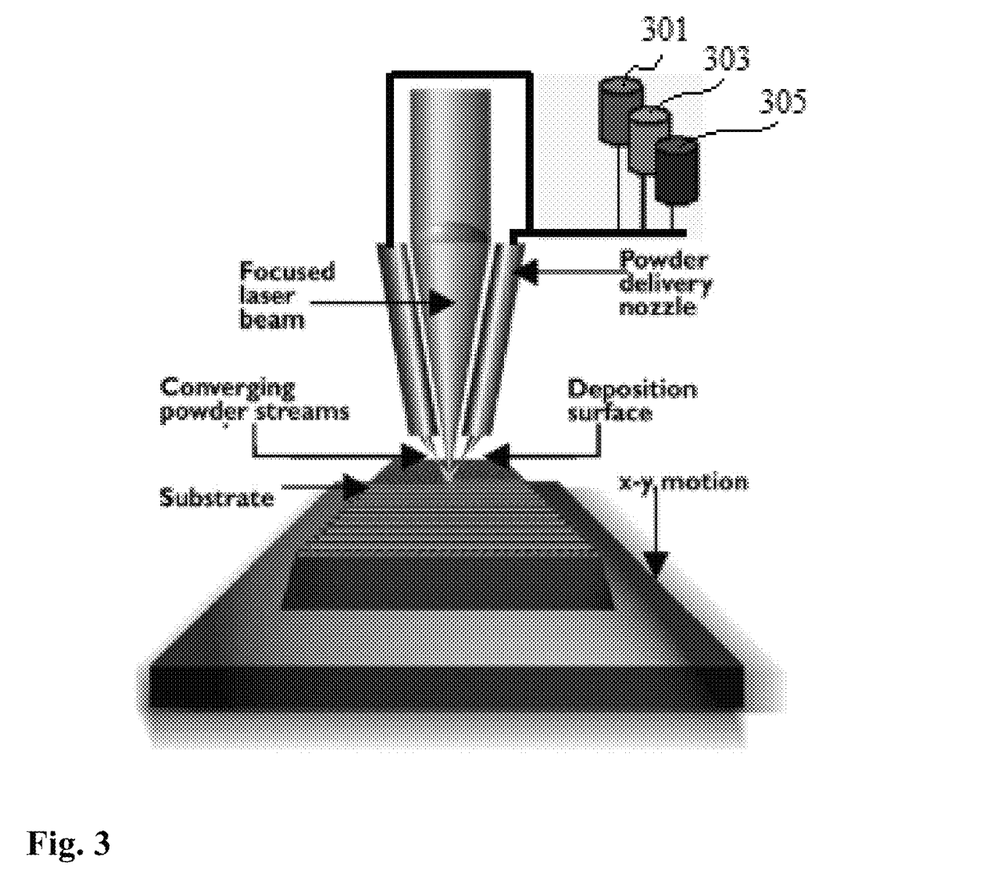
FIG. 3 is a schematic view of an embodiment of an additive manufacturing assembly configured to perform the methods disclosed herein.

Referring to FIG. 1B, the method further comprises joining the metallic substrate 101 with a second metallic material 105 that is different from the first metallic material 103. As shown in FIG. 1B, the second metallic material 105 and the first metallic material 103 can be joined directly such that they are fusion bonded together. The joining can be done by any suitable additive manufacturing process, such as by laser metal deposition (LMD). A typical schematic of a LMD system is shown in FIG. 3, the system having a laser beam focused on a part of a substrate, with separate powder reservoirs 301, 303, and 305 that converge to a powder delivery nozzle. The LMD system shown schematically in FIG. 1B has a powder nozzle 151, which could be connected to a single powder reservoir or multiple powder reservoirs (not shown), and at least one energy applicator 153 such as a laser. The energy applicator forms a melt pool 155 comprised of molten metallic material. Referring to FIG. 1C, the second metallic material 105 can deposited on the first metallic material 103 layer by layer, resulting in the joined article shown in FIG. 1D.

The additive manufacturing processes are performed herein such that the porosity of the joint is less than about 0.1 percent by volume, measured according to ASTM B-962. This means that a strong, substantially crack free bond (e.g., without an intermetallic brittle phase) is formed between the first metallic material and the second metallic material. This allows joining of dissimilar metallic materials without degrading performance. The additive manufacturing processes are also performed with a very high melt pool 155 cooling rate such that no intermetallic brittle phase forms at the interface between the first metallic material and the second metallic material. The cooling rate can be between about 100 and 5000° C. per second, such as between about 100 and 3000° C., 100 and 2000° C., or 100 and 1000° C. per second.

Figure 2A:
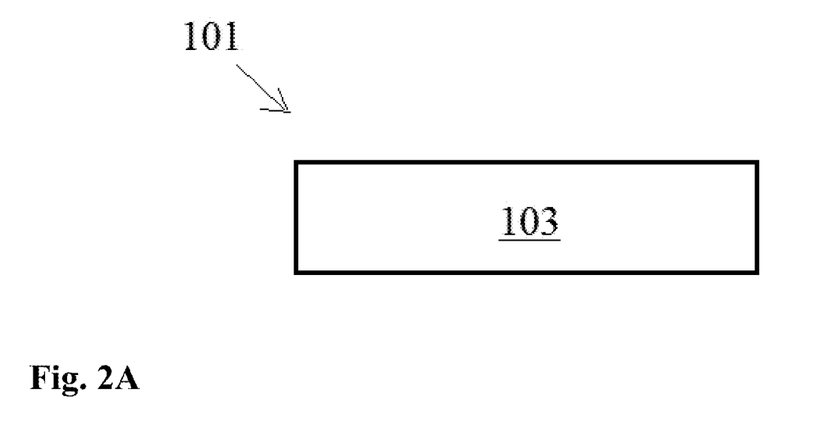
FIGS. 2A-2D show joining, by additive manufacturing, of a first metallic material and a second metallic material with a buffer layer between the materials.
Figure 2B:
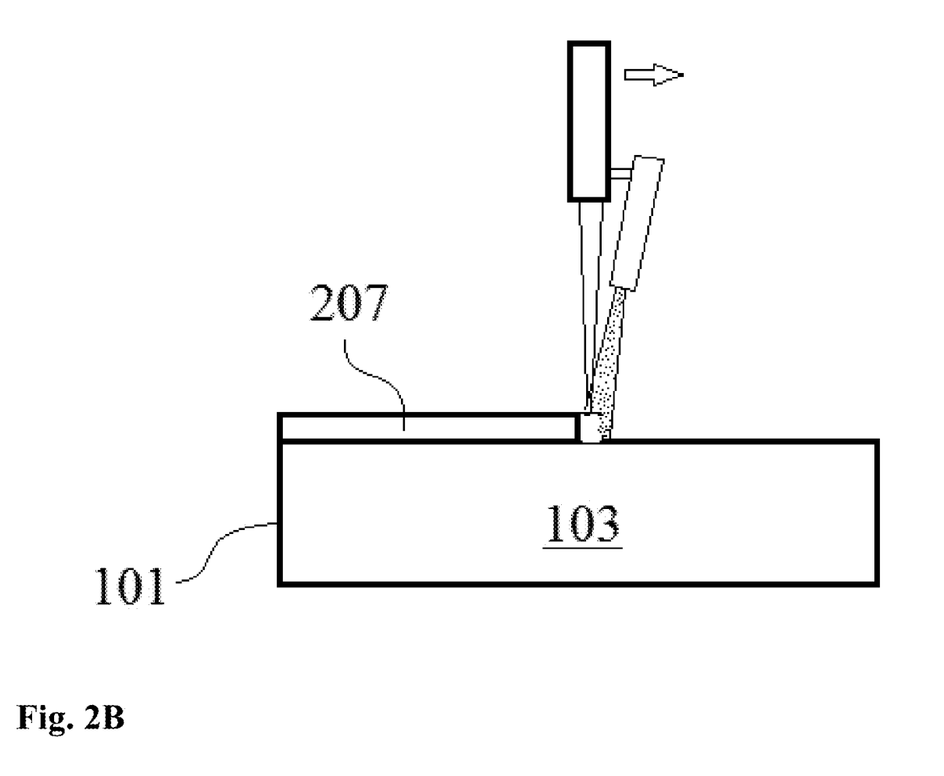
Figure 2C:
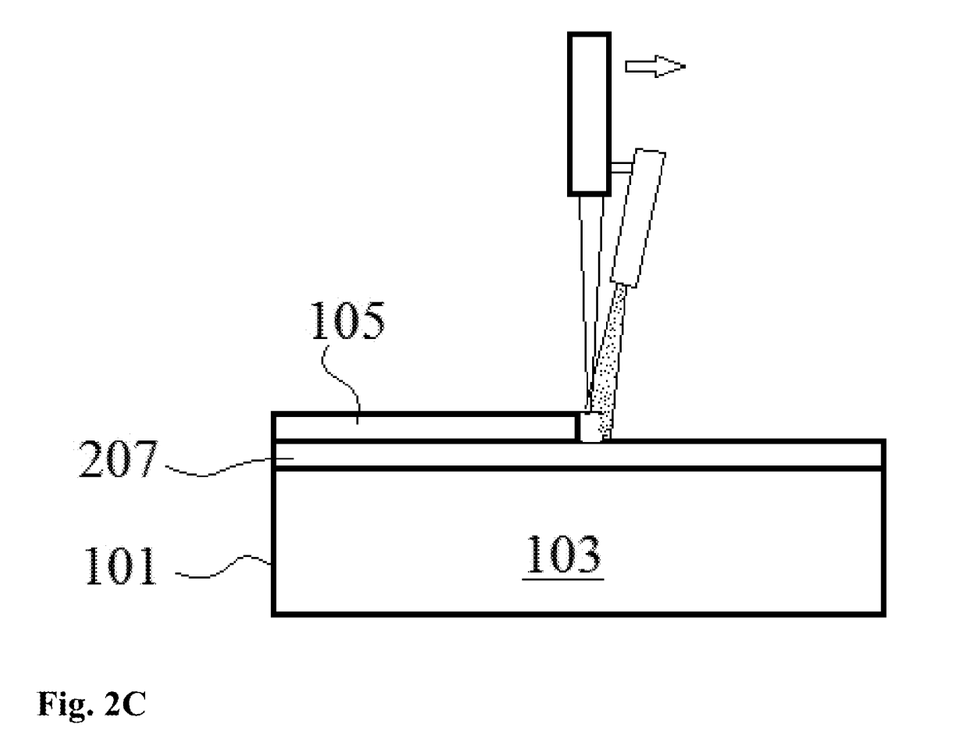
Figure 2D:
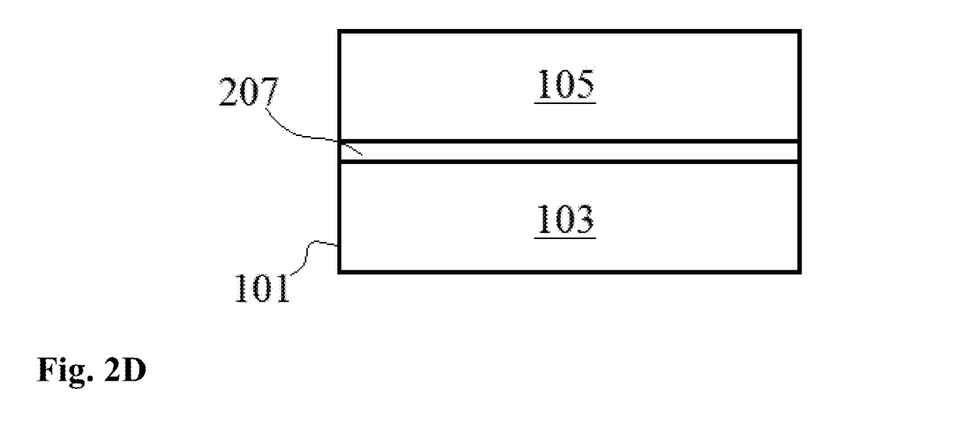

Referring to FIGS. 2A and 2B, the methods herein can also include forming a transition layer 207 on the metallic substrate 101, and then additively manufacturing the second metallic material 105 on the transition layer 207 as shown in FIG. 2C. The result is the joined article shown in FIG. 2D.

In certain embodiments, forming the transition layer 207 can include mixing a powder of the first metallic material 103 and a powder of the second metallic material 105 to form a mixture and using the mixture to additively manufacture the transition layer 207. For example, using the system shown in FIG. 3 and controlling flow rates from each powder reservoir 301, 303, and 305 can allow active mixing of two or more powders in certain proportions. The system can include any suitable controller having any suitable hardware and/or software configured to control the powder delivery and energy application.

In certain embodiments, the transition layer 207 can be a buffer layer made of a buffer material (e.g., a third metallic material). The buffer material acts as a glue to bond the first and second metallic materials together. For example, the buffer material can be selected to be compatible with the first metallic material 103 and the second metallic material 105 to allow fusion on both sides of the transition layer 207 without formation of an intermetallic brittle phase.

The first metallic material 103 and the second metallic material 105 can be dissimilar metals or dissimilar metal alloys. For example, the first metallic material 103 and/or the second metallic material 105 can include at least one of iron-based alloys, steel, nickel-based alloys, aluminum-based alloys, titanium-based alloys, cobalt-based alloys and copper-based alloys or any combinations thereof. In certain embodiments, one of the first metallic material 103 or the second metallic material 105 can include one of aluminum or magnesium, and the other of the first metallic material 103 or the second metallic material 105 can be one of steel or titanium.

In certain embodiments, the buffer material (in layer 207) can include molybdenum, e.g., where one of the first metallic material 103 or the second metallic material 105 is iron, and the other of the first metallic material 103 or the second metallic material 105 is titanium. The buffer material can include silver, e.g., where one of the first metallic material 103 or the second metallic material 105 is aluminum, and the other of the first metallic material 103 or the second metallic material 105 is one of an iron-nickel alloy or a nickel-cobalt alloy. The buffer material can include nickel, e.g., where one of the first metallic material 103 or the second metallic material 105 is copper, and the other of the first metallic material 103 or the second metallic material 105 is iron.

In certain embodiments, the transition layer 207 can be formed to have a thickness of about 1 mm or less, 0.5 mm or less, 0.1 mm or less, or even 0.025 mm or less, to have sharp transition gradient from the first metallic material 103 to the second metallic material 105. For example, the transition layer 207 can be formed to be about 0.025 to 0.75 mm, 0.1 to 0.5 mm, 0.15 to 0.25 mm, or 0.20 to 0.30 mm thick.

Figure 4:
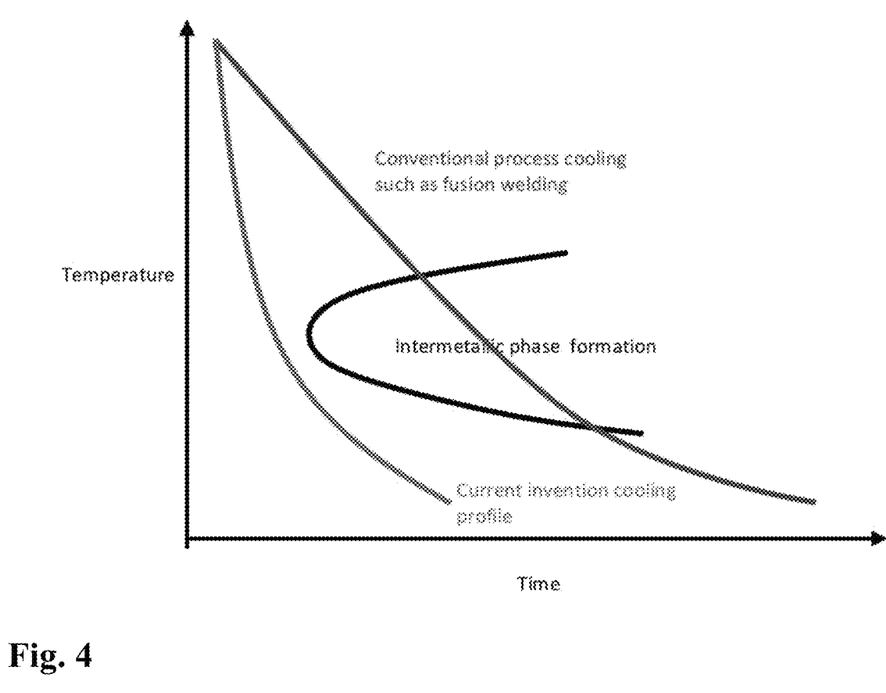
FIG. 4 is a chart showing cooling rates relative to intermetallic brittle phase formation.

Embodiments of the invention also include methods using additive manufacturing processes to fabricate components for any suitable structural and/or functional applications, the components including two or more types of dissimilar metals/alloys. Certain embodiments include kinetically avoiding intermetallic brittle phase formation by using fast cooling rates in the additive manufacturing process. Phase transformation in metals and metal alloys is a time and temperature dependent process. FIG. 4 shows a schematic Continuous Cooling Transformation (CCT) diagram for an exemplary homogeneous metallic solution. As shown in FIG. 4, if the cooling rate is fast enough, the intermetallic phase formation can be avoided or substantially mitigated. The cooling rate of additive processes can be about ten times or more faster than that of conventional process such as fusion welding.

Figure 5:
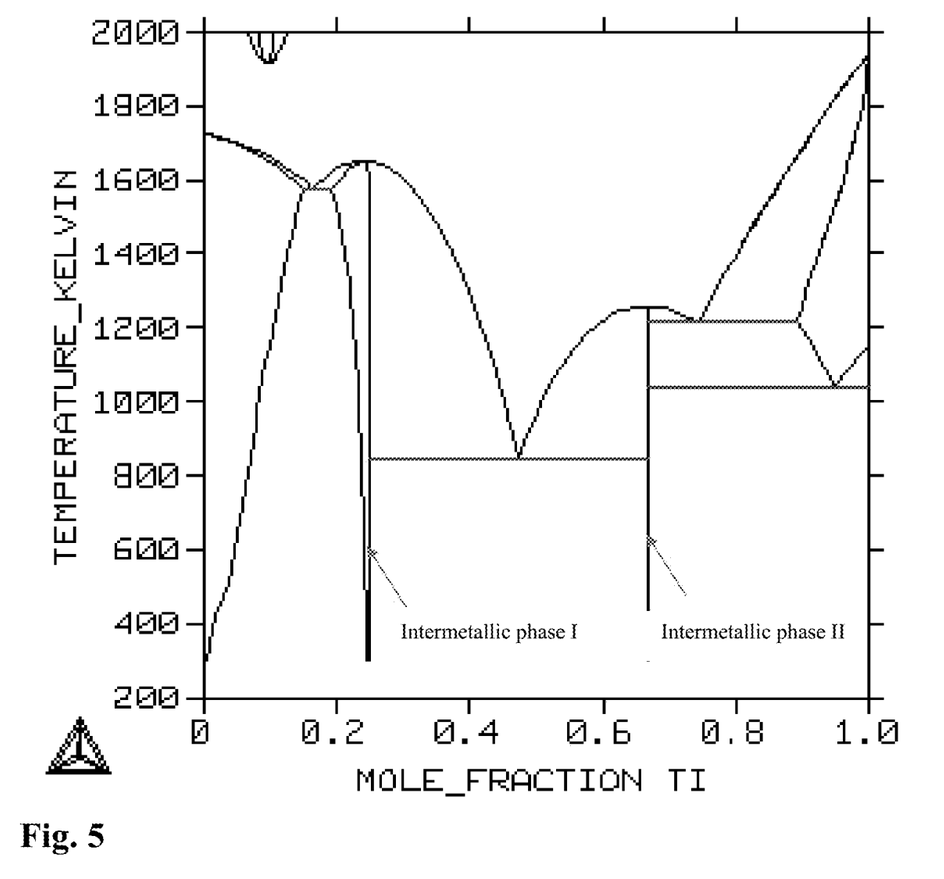
FIG. 5 is a phase diagram of Ni—Ti with two intermetallic brittle phases highlighted.
Figure 6:
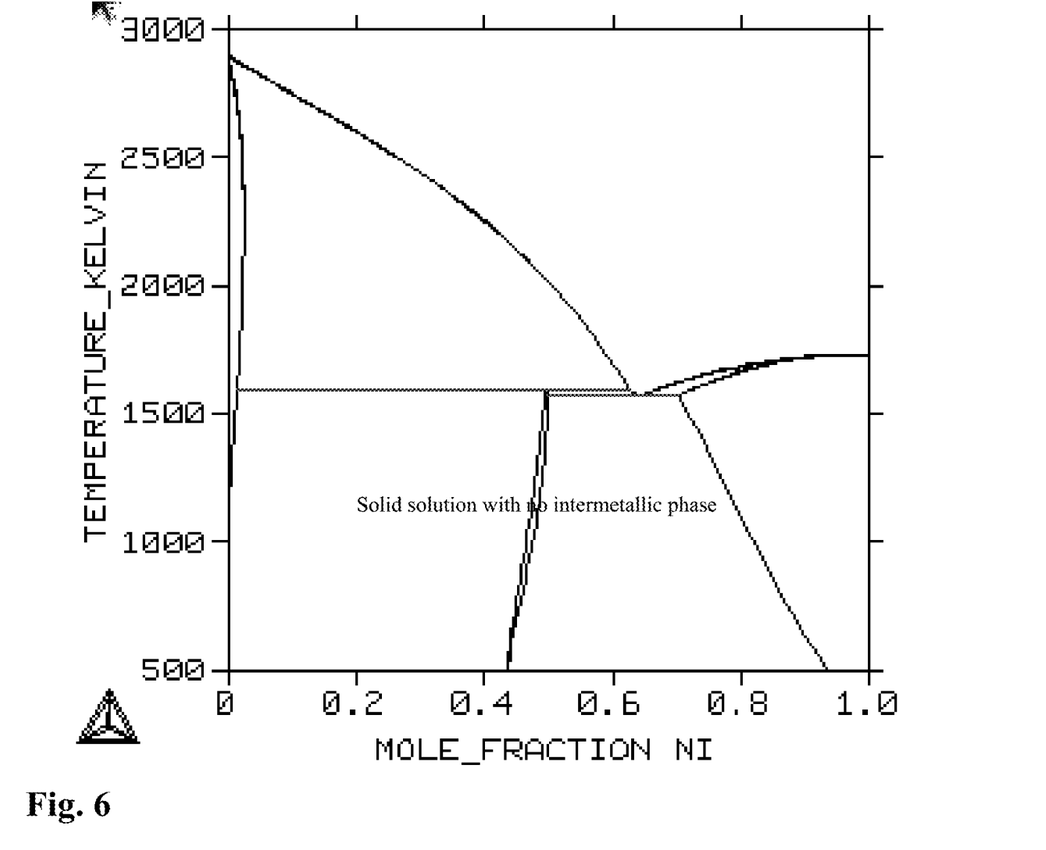
FIG. 6 is a phase diagram of Mo—Ni.
Figure 7:
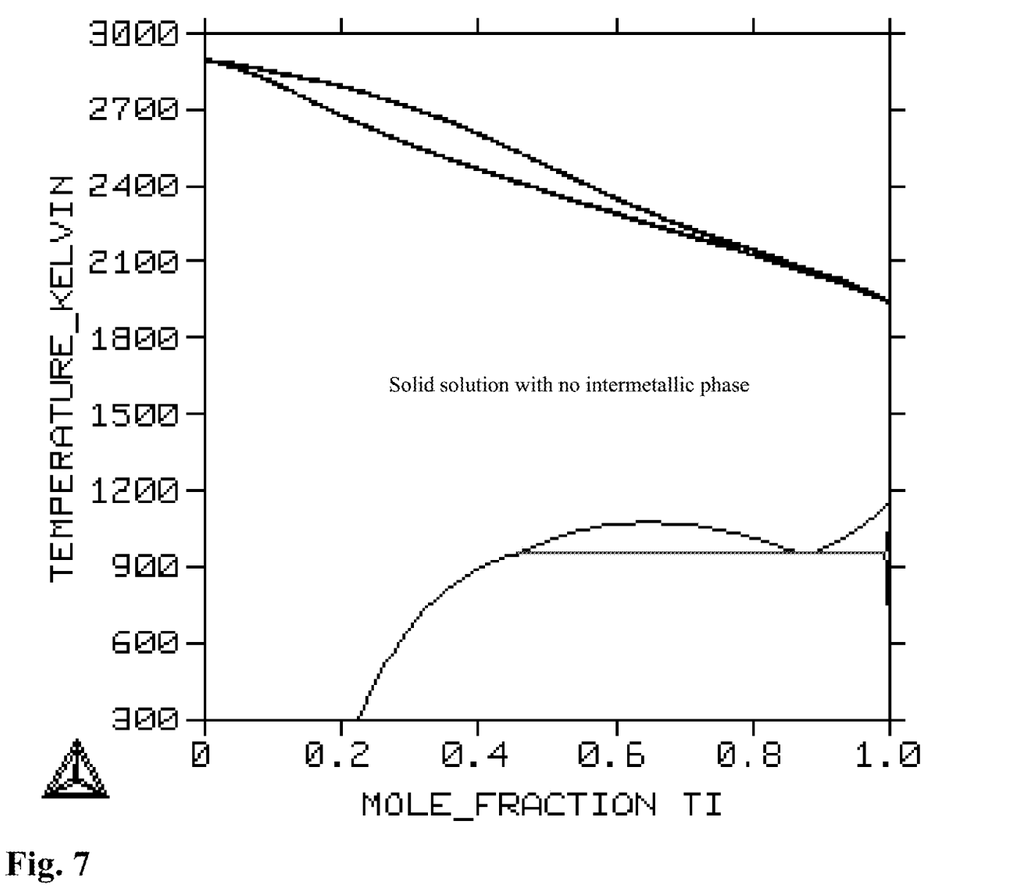
FIG. 7 is a phase diagram of Mo—Ti.

Embodiments of the invention also include avoiding intermetallic brittle phase formation through insertion of a buffer layer between dissimilar metals/alloys, in which the material of the buffer layer is miscible with the metals/alloy on either side. Materials for certain buffer layers can be identified from available phase diagrams, or in any other suitable manner. As an example, if an Ni and Ti dissimilar metal pair are to be joined together, at the Ni—Ti interface several brittle intermetallic phases can potentially form during solidification. These may include Ni3Ti, B2, and NiTi, as shown by the Ni—Ti phase diagram of FIG. 5. This type of phase diagram can be generated for other metals/alloys using an appropriate software program, such as Thermo-Calc software. To avoid the formation of such Ni—Ti intermetallics, a Mo buffer layer can be inserted additively between Ni and Ti because Mo is totally miscible with either Ni or Ti, as shown by the Mo—Ni phase diagram of FIG. 6 and the Mo—Ti phase diagram of FIG. 7.

The choice of buffer layer materials may vary from system to system. For example, some embodiments of suitable buffer materials with respect to certain material pairs are provided in Table 1. Both dissimilar metal/alloy pair and buffer material include metals of the specified element in pure form or alloys with the specified element as major alloying element.

TABLE 1

| Dissimilar metal/alloy A | Buffer | Dissimilar metal/alloy B |
|---|---|---|
| Fe | Mo | Ti |
| Al | Ag | Fe/Ni |
| Al | Ag | Ni/Co |
| Cu | Ni | Fe |

As noted above, certain embodiments include creating a sharp composition transition between dissimilar metals/alloys. The transition layer or the buffer layer can be formed to have a thickness of about 1 mm or less, 0.5 mm or less, 0.1 mm or less, or even 0.025 mm or less, to have a sharp transition gradient. For example, the transition layer or the buffer layer can be formed to be between about 0.01, 0.02, 0.025, 0.05, 0.1, or 0.15 mm to 0.05, 0.1, 0.15, 0.35, 0.5, or 1 mm thick, including any combination of any minimum or maximum value recited herein. The length scale and composition profile of the transition zone can be selected for properties as desired for a particular application or design. A sharp transition zone at the boundary between bonded dissimilar materials does not negatively impact the performance of the component. This is because the boundary transition zone layer has small length scale. In addition, small transition zone length scale is suitable for the components with required geometry.

Embodiments of methods disclosed herein are capable of making step-out functional performance comparing with existing metals/alloys including but not limited to corrosion resistance, erosion resistance, high strength and toughness, light weight and high thermal conductivity. Embodiments are applicable to many metallic systems, including but not limited to, iron-based alloys, steel, nickel-based alloys, aluminum-based alloys, titanium-based alloys, cobalt-based alloys and copper-based alloys and combinations thereof. Embodiments of articles of manufacture can include any suitable equipment and/or structures used in oil and gas operations (e.g., pipes, tools, etc.), or any other suitable article of manufacture.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method comprising joining, using additive manufacturing, a first metallic material and a second metallic material that is different from the first metallic material,
wherein the joining comprises forming a buffer layer joint, the buffer layer joint comprising a material that is different from both the first and second metallic materials, on the first metallic material before additively manufacturing the second metallic material on the buffer layer joint, and
wherein the buffer layer joint is a single layer between the first metallic material and the second metallic material, has a thickness in the range of about 0.01 millimeter to about 0.025 millimeter, and has a porosity of less than about 0.1 percent by volume, measured according to ASTM B-962.

2. The method of claim 1, wherein the additive manufacturing uses a meltpool cooling rate such that no intermetallic brittle phase exists between the first metallic material and the second metallic material.

3. The method of claim 2, wherein the cooling rate is between about 100° C. to about 5,000° C. per second.

4. The method of claim 1, wherein the additive manufacturing includes laser metal deposition (LMD).

5. The method of claim 1, wherein the buffer layer joint material is compatible with the first metallic material and the second metallic material to allow fusion on both sides of the buffer layer without formation of an intermetallic brittle phase.

6. The method of claim 1, wherein at least one of the first metallic material and the second metallic material comprises an iron-based alloy, steel, nickel-based alloy, aluminum-based alloy, titanium-based alloy, cobalt-based alloy, copper-based alloy, or any combinations thereof.

7. The method of claim 1, wherein the first metallic material comprises at least one of aluminum or magnesium and the second metallic material comprises at least one of steel or titanium.

8. The method of claim 1, wherein the buffer layer joint material comprises molybdenum, the first metallic material comprises iron, and the second metallic material comprises titanium.

9. The method of claim 1, wherein the buffer layer joint material comprises silver, the first metallic material comprises aluminum, and the second metallic material comprises an iron-nickel alloy.

10. The method of claim 1, wherein the buffer layer joint material comprises silver, the first metallic material comprises aluminum, and the second metallic material comprises a nickel-cobalt alloy.

11. The method of claim 1, wherein the buffer layer joint material comprises nickel, the first metallic material comprises copper, and the second metallic material comprises iron.

12. The method of claim 1, wherein the first metallic material and the second metallic material are steel or titanium-based alloys, the buffer layer is molybdenum, and the first metallic material is different from the second metallic material.

* * * * *